March 17, 1942.  H. F. PATRICK  2,276,625
MACHINE TOOL
Filed Aug. 17, 1939  5 Sheets-Sheet 1
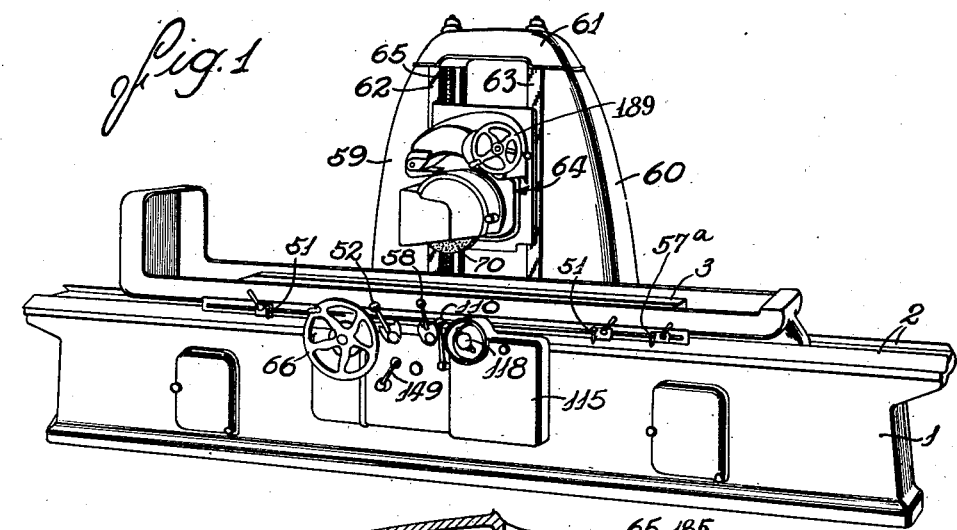
Fig. 1
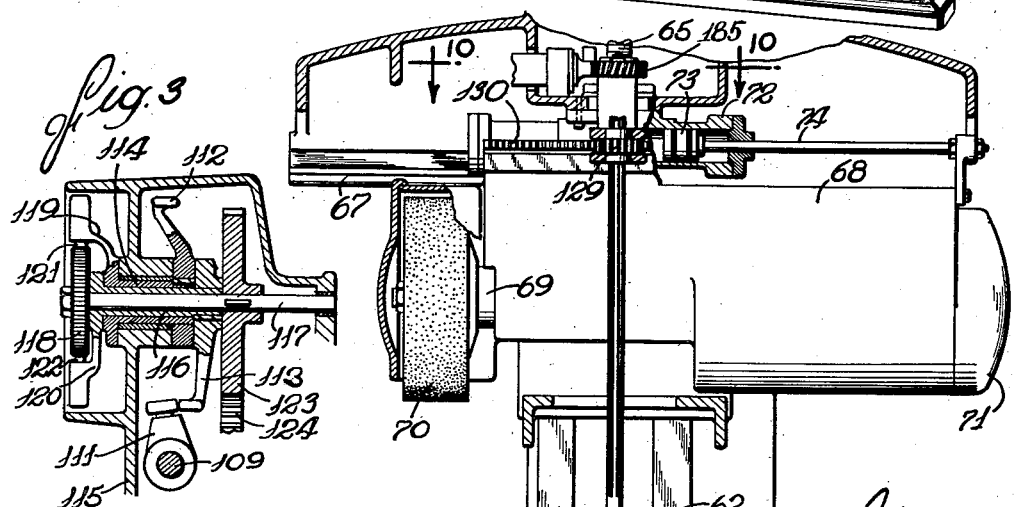
Fig. 3  Fig. 2
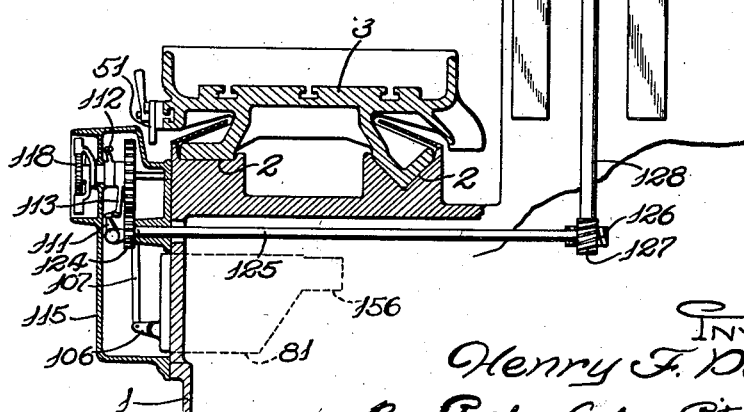
INVENTOR
Henry F. Patrick
By Parker, Carlson, Pitney & Hubbard
ATTORNEYS

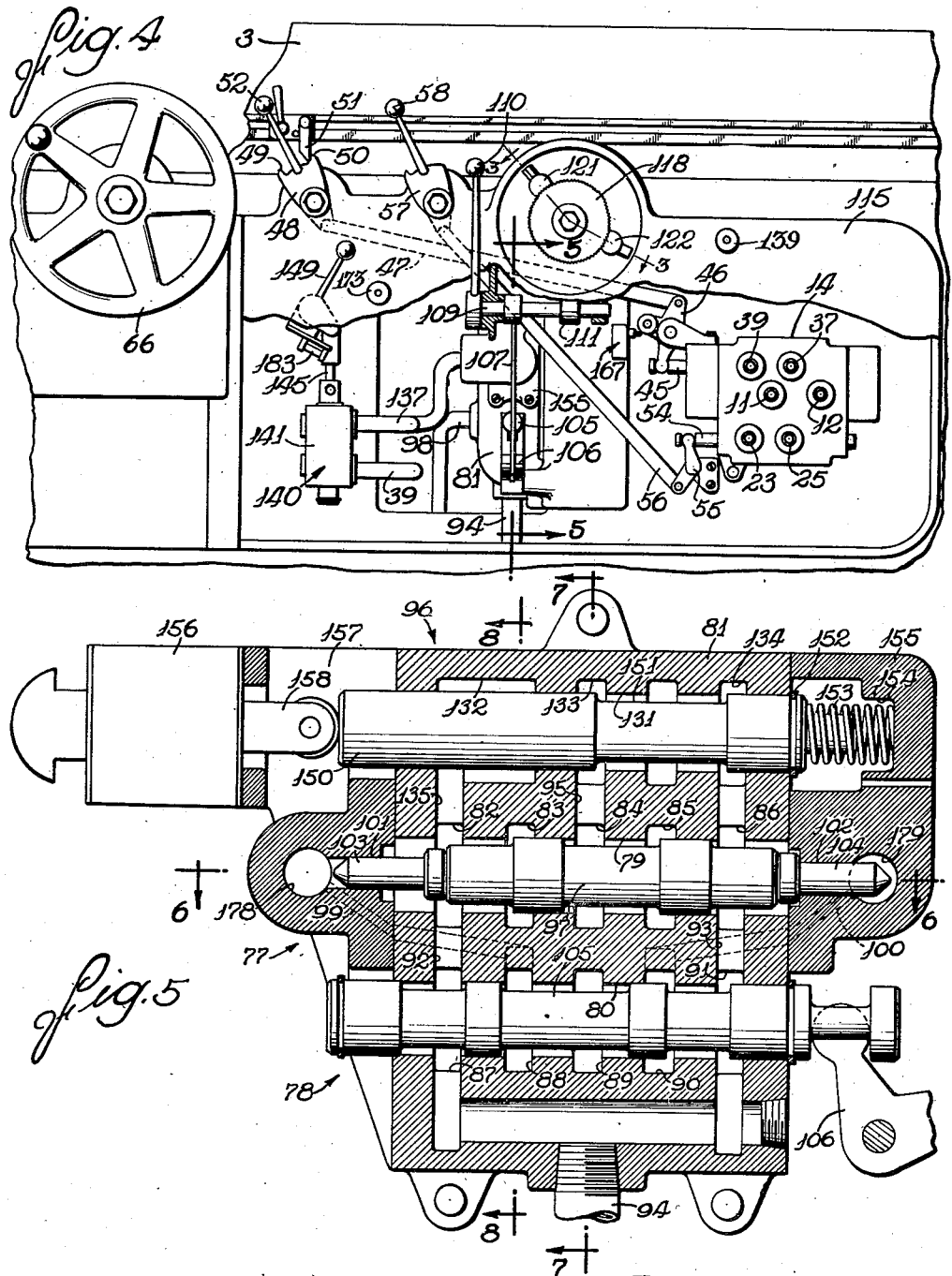

March 17, 1942. H. F. PATRICK 2,276,625
MACHINE TOOL
Filed Aug. 17, 1939 5 Sheets-Sheet 3
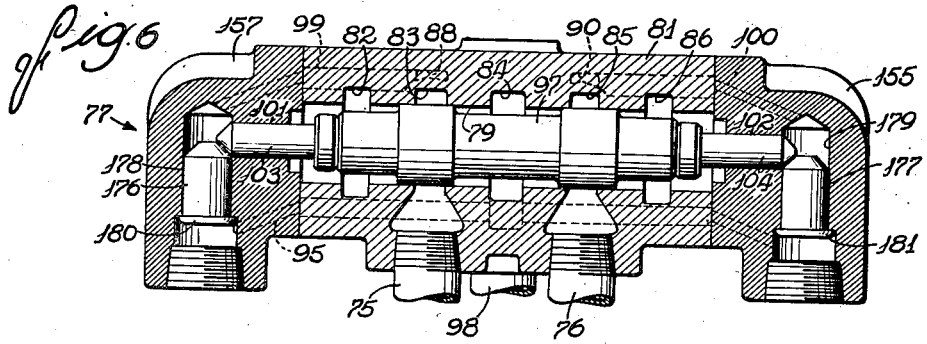
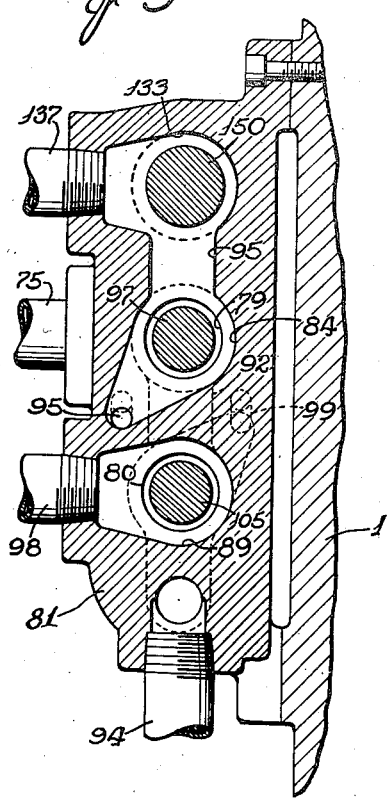
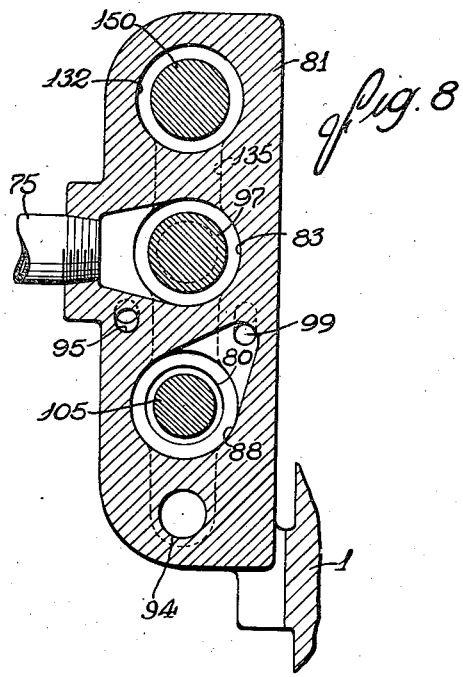
INVENTOR
Henry F. Patrick
By Parker, Carlson, Pitzner & Hubbard
ATTORNEYS

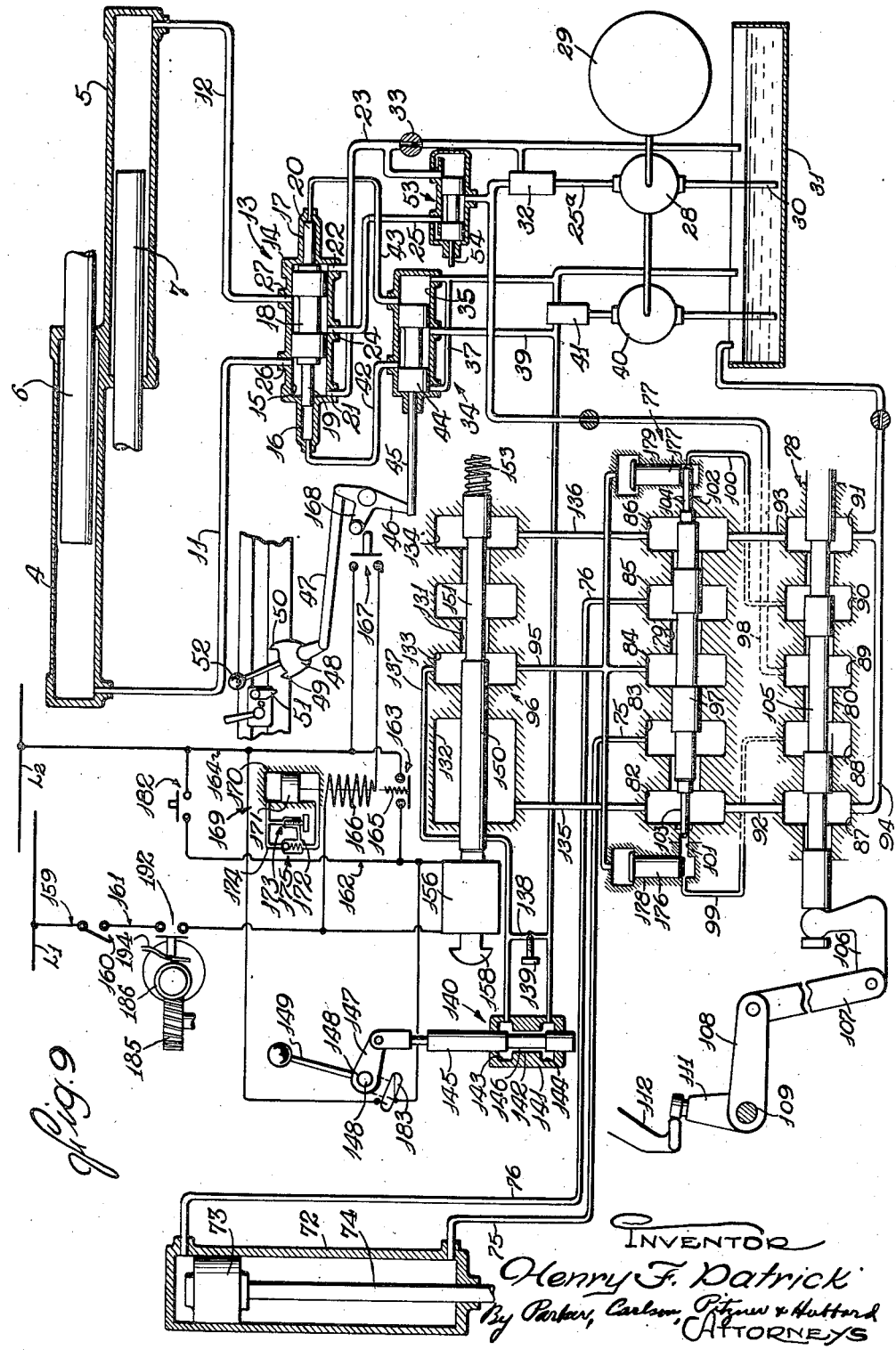

March 17, 1942.   H. F. PATRICK   2,276,625
MACHINE TOOL
Filed Aug. 17, 1939   5 Sheets-Sheet 5

INVENTOR
Henry F. Patrick
By Parker, Carlson, Pitner & Hubbard
ATTORNEYS

Patented Mar. 17, 1942

2,276,625

UNITED STATES PATENT OFFICE 2,276,625

MACHINE TOOL

Henry F. Patrick, Rockford, Ill., assignor to Mattison Machine Works, Rockford, Ill., a corporation of Illinois Application August 17, 1939, Serial No. 290,538

21 Claims. (Cl. 51—92)

The present invention relates to improvements in machine tools, and has particular reference to a new and improved metal removing machine, such as a grinding machine, in which the tool is adapted to take a series of cuts along the work, and to be indexed transversely of the work for successive cuts.

One of the objects of the present invention is to provide a machine tool of the foregoing character having novel hydraulic means for automatically effecting a relative indexing of the tool across the work in a step-by-step movement.

Another object is to provide a new and improved hydraulic indexing mechanism in which the extent of each indexing movement is subject to a finely graduated adjustment over a wide range.

A further object is to provide a hydraulic indexing mechanism including a novel indexing control valve which is normally open to relieve the motive fluid pressure, and adapted to be closed periodically to maintain the pressure for a predetermined time interval to effect the indexing movement, and which is operable with a quick action alternately into open and closed positions to prevent coasting or indeterminate movement of the indexed element.

A more specific object resides in the provision of a novel electrical control means for the indexing control valve.

Another object resides in the provision of means available at will for obtaining either a step-by-step indexing movement, a rapid continuous indexing movement, or a slow continuous indexing movement.

A further object is to provide a novel hydraulic indexing mechanism which is automatically operable to reverse the direction of indexing movement upon movement of the indexed element into a predetermined position, but which upon the institution of such reversal after one cut along the work serves to delay completion of the reversal until after the next cut.

Further objects and advantages will become apparent as the description proceeds.

In the accompanying drawings, Figure 1 is a front perspective view of a machine embodying the features of my invention.

Fig. 2 is a fragmentary transverse vertical sectional view through the machine.

Fig. 3 is an enlarged vertical sectional view taken substantially along line 3—3 of Fig. 4.

Fig. 4 is a fragmentary front view of the machine, part of the front cover housing being broken away to expose the control means.

Fig. 5 is a vertical sectional view taken substantially along line 5—5 of Fig. 4.

Figs. 6, 7 and 8 are fragmentary sectional views taken respectively along lines 6—6, 7—7 and 8—8 of Fig. 5.

Fig. 9 is a diagrammatic respresentation of the hydraulic and electrical control circuits for the machine.

Figure 10:
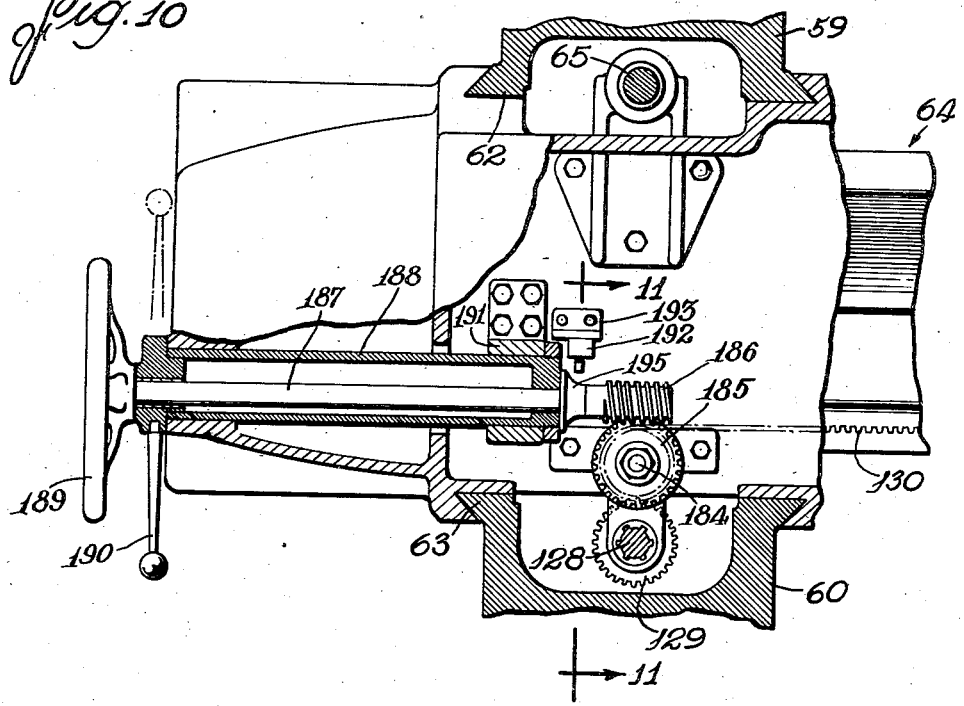

Fig. 10 is a fragmentary horizontal sectional view taken along line 10—10 of Fig. 2.

Figure 11:
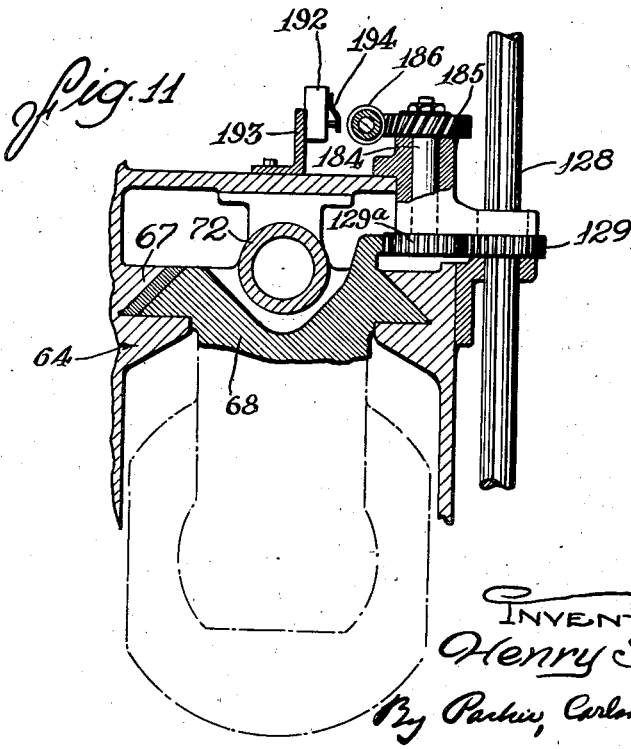

Fig. 11 is a vertical sectional view taken along line 11—11 of Fig. 10.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the invention, for purposes of illustration, is embodied in a grinding machine of the type disclosed in United States Letters Patent No. 1,927,007, dated September 12, 1933, adapted for the grinding of plane surfaces. In the form shown, the grinding machine comprises a long horizontal bed 1 formed on the top with parallel longitudinal ways 2. A work carriage 3, adapted to support the work to be ground, is suitably mounted for reciprocation on the ways 2.

Any suitable drive may be provided for reciprocating the work carriage 3. In the present instance, the drive (see Fig. 9) comprises two parallel hydraulic cylinders 4 and 5, the adjacent ends of which overlap and are rigidly connected, and which are rigidly mounted within the bed 1. Two rams 6 and 7 of equal diameter are slidable respectively in the cylinders 4 and 5, and project in opposite directions from the adjacent ends of the cylinders for connection (not shown) to the underside of the work carriage 3.

The outer or remote ends of the cylinders 4 and 5 are connected respectively through passages 11 and 12 to a direction valve 13. This valve comprises a casing 14 formed with a cylindrical valve chamber 15 and with two small chambers 16 and 17 opening axially to opposite ends thereof. A valve member 18 of the spool type is reciprocable in the chamber 15, and has axial reduced end extensions or plungers 19 and 20 extending slidably into the chambers 16 and 17. Formed in the chamber 15 are two exhaust ports 21 and 22 at the ends and opening to an exhaust passage 23, an inlet port 24 midway of the exhaust ports and connected to a supply passage 25, and two ports 26 and 27 respectively intermediate the inlet port 24 and the exhaust ports, and connected to the passages 11 and 12. The arrangement is such that, in one end position of the valve member 18, the passages 11 and 12 are connected respectively to the exhaust and pressure passages 23 and 25, and, in the other end position of the member, the connections are reversed.

The supply passage 25 is adapted to be connected through a start and stop valve 53 to a suitable source of fluid medium, such as the discharge line or passage 25ᵃ of a constant-pressure delivery pump 28 driven by an electric motor 29. The intake of the pump 28 is connected through a line or passage 30 to a supply tank or sump 31 adapted to contain a substantially noncompressible liquid, such as oil. Interposed in the pressure line 25ᵃ at the outlet side of the pump 28 is a relief valve 32 which is operable to discharge fluid, in excess of that required to maintain a predetermined pressure, to the exhaust conduit 23. The exhaust conduit 23 discharges to the sump 31. An adjustable restriction orifice 33 is interposed in the conduit 23 to maintain a relatively low back pressure.

The direction valve 13 is hydraulically adjustable under the control of a pilot valve 34 which comprises a cylindrical chamber 35 preferably also formed in the casing 14. Opposite ends of the chamber 35 open to an exhaust line or passage 37 which discharges to the sump 31. A pressure passage 39 opens to the chamber 35 midway of the ends, and is connected to a suitable source of fluid medium, such as a constant-pressure delivery pump 40 also driven by the motor 29 and taking fluid from the sump 31. Interposed in the conduit 39 is a relief valve 41 by-passing to the sump 31 and operable to limit the pilot pressure to a predetermined maximum preferably less than the pressure in the conduit 25. Two passages 42 and 43 open from the chamber 35 respectively at opposite sides of the conduit 39 to the closed outer ends of the chambers 16 and 17 of the direction valve 13. A valve member 44 of the spool type is slidable in the chamber 35, and serves in one end position to connect the passages 42 and 43 respectively to the passages 39 and 37 so as to cause movement of the direction valve member 18 to the right to effect movement of the carriage 3 to the left, and in the other end position to reverse these connections so as to reverse the direction valve to effect movement of the carriage to the right.

The pilot valve member 44 has an axial rod 45 which extends slidably through one end wall of the chamber 35, and which is connected at the outer end to one end of a lever 46 pivoted on the casing 14. The other end of the lever 46 is connected through a link 47 to a lever 48 pivoted on the front of the bed 1, and formed with two arcuately spaced lugs 49 and 50. Two pivotal dogs 51, adjustably mounted on the front of the carriage 3, are adapted for alternate engagement respectively with the lugs 49 and 50 to effect reversal of the direction valve 13 upon movement of the carriage 3 respectively into opposite end positions. The lever 48 is provided with a handle 52 for effecting manual adjustment of direction valve 13 at will.

The start and stop valve 53 comprises a valve member 54 slidable in the casing 14, and operable in opposite end positions respectively to connect the passage 25ᵃ either to the passage 25 or the exhaust passage 23. One end of the valve member 54 is connected to one arm of a lever 55 pivoted on the front of the bed 1. Another arm of the lever 55 is connected through a link 56 to a lever 57 also pivoted on the front of the bed 1 and provided with a handle 58. The lever 57 is adapted for engagement by a dog 57ᵃ, upon movement of the adjacent dog 51 into inoperative position, to stop the machine. It will be seen that the valves 13, 34 and 54 are incorporated in a unitary valve structure including the casing 14. This structure is mounted on the front wall of the bed 1, and is suitably enclosed by a front cover plate or housing 115 on which the levers 48 and 57 are pivoted.

Rigidly mounted on the rear of the bed 1 are two spaced vertical columns 59 and 60 connected at their upper ends by a cross member 61. The adjacent sides of the columns 59 and 60 are formed with vertical ways 62 and 63, on and between which a tool head 64 is mounted for vertical adjustment. The tool head 64 is supported for vertical adjustment by a feed screw 65 extending along the column 59 and operable from the front of the bed 1 by means of a hand wheel 66.

Mounted on ways 67 on the underside of the tool head 64 between the columns 59 and 60 for adjustment transversely of the carriage 3 is a tool slide 68. A tool spindle 69 supporting a grinding wheel 70 is journaled in the slide 68, and adapted to be driven by an electric motor 71.

The tool slide 68 is movable step-by-step across the work carriage 3 in timed relation to the reversals of the latter, and the power drive for this purpose includes a hydraulic motor consisting of a cylinder 72 mounted on the tool head 64 and a piston 73 slidable in the cylinder and connected through a rod 74 to the rear end of the slide.

The opposite ends of the cylinder 72 are connected respectively through lines or passages 75 and 76 to a direction valve 77 controlled by a pilot valve 78. These valves comprise respectively two cylindrical bores or chambers 79 and 80 preferably formed in a single casing 81 mounted on the front of the bed 1 inside the front housing 115. The chamber 79 is formed with five longitudinally spaced annular grooves 82 to 86, and the chamber 80 is similarly formed with grooves 87 to 91. The end grooves 82 and 86 of the valve 77 are connected through exhaust passages 92 and 93 to the end grooves 87 and 91, and the latter are connected through an exhaust conduit or passage 94 to the sump 31. Of the valve 77, the grooves 83 and 85 open to the passages 75 and 76, and the central groove 84 opens to a pressure inlet line or passage 95 adapted to receive liquid under pressure from the line or passage 39 through an index control valve 96. Slidably mounted in the chamber 79 is a valve member 97 of the spool type. This member serves in one end position to connect the passages 75 and 76 respectively to the pressure inlet passage 95 and the exhaust groove 86 to effect indexing in a forward direction. In the other end position, the valve member 97 serves to connect the passages 75 and 76 respectively to the exhaust groove 82 and the passage 95 so as to reverse the direction of indexing. In central or intermediate position, the valve member 97 blocks both passages 75 and 76 from the passage 95.

Referring again to the pilot valve 78, the central or intermediate groove 89 is open to a pressure inlet line or passage 98 branching from the passage 25ᵃ, and the grooves 88 and 90 are connected respectively through passages 99 and 100 to the outer ends of two small cylinder bores 101 and 102 opening axially to opposite ends of the direction valve chamber 79. Suitable pistons 103 and 104 extend axially from opposite ends of the direction valve member 97 respectively into the bores 101 and 102. Slidably mounted in the pilot valve chamber 80 is a valve member 105 of the spool type which in one end position serves to connect the passages 99 and 100 respectively to the pressure and exhaust passages 98 and 94 and in the other end position serves to reverse these connections.

The pilot valve 78 is automatically operable to reverse the direction valve 77 at each end of the cross feed movement of the slide 68. Thus, the forward end of the valve member 105 is pivotally connected to one arm of a bell crank lever 106 pivoted on the valve casing 81. The other arm of the lever 106 is connected through a link 107 to an arm 108 fixed on a rock shaft 109 journaled in the front housing 115. A hand lever 110 fixed on one end of the shaft 109 affords means for adjusting the pilot valve 78 manually. Also fixed on the shaft 109 is a vertical rocker arm 111 adapted for alternate engagement at opposite sides by two angularly spaced cam levers 112 and 113 rotatable about a common axis in timed relation to the movement of the cross slide 68.

The cam lever 112 is fixed on the inner end of a tubular shaft 114 journaled in and extending through the front wall of the cover housing 115 enclosing the various valve units of the machine. The cam lever 113 likewise is fixed on the inner end of a tubular shaft 116 extending through and rotatable in the shaft 114. Extending axially through the shaft 116 is a drive shaft 117 on the outer end of which a ratchet wheel 118 is secured. Two arms 119 and 120 rigid respectively with the outer ends of the shafts 114 and 116 are provided with releasable detents 121 and 122 adapted for adjustable engagement with the ratchet wheel 118 to connect the cam levers 112 and 113 in different relative angular positions for rotation with the shaft 117.

The inner end of the shaft 117 is connected through gears 123 and 124 to a shaft 125 extending through the bed 1 to the rear between the columns 59 and 60. The rear end of the shaft 125 is connected through spiral gears 126 and 127 to the lower end of a vertical spline shaft 128 suitably anchored against endwise movement. A gear 129 rotatably mounted in the tool head 64 for vertical movement therewith is splined to the shaft 128, and meshes with an idler gear 129a meshing with a longitudinal gear rack 130 on the side of the spindle slide 68.

It will be seen that upon forward movement of the slide 68 into a predetermined end position, as determined by the setting of the cam lever 112, the latter will engage and oscillate the arm 111 rearwardly. This will adjust the pilot valve 78 to direct pressure fluid into the passage 99. Thereupon, the direction valve 77 will be shifted to direct pressure fluid through the passage 76 to the front of the cross feed cylinder 72 so as to institute a rearward or return cross feed of the slide 68. Similarly, at the end of the rearward index movement, the cam lever 113 will rock the arm 111 forwardly to reinstitute the forward cross feed. The range and extent of the tool cross feed is, therefore, determined by the relative angular adjustments of the cam levers 112 and 113 relative to the shaft 117.

The valve 96 is automatically operable upon each reversal of the work carriage 3 for a predetermined time period to cause the supply of fluid under pressure from the passage 39 to the passage 95. In the form shown, the valve 96 comprises a cylindrical chamber 131 in the valve casing 81, and formed with a plurality of annular grooves 132, 133 and 134. The end grooves 132 and 134 are connected respectively through passages 135 and 136 to the exhaust grooves 82 and 86, and the intermediate groove 133 is open to an inlet passage 137 connected to the pressure passage 39 through a passage 138 including an adjustable restricted orifice 139. The passage 137 is also adapted to be connected to the passage 39 for the unrestricted supply of pressure fluid through a valve 140 in parallel with the orifice 139. This valve 140 comprises a casing 141 having a cylindrical chamber 142 with two spaced grooves 143 and 144 connected respectively to the passages 137 and 139, and a valve member 145 slidable in the chamber and having a recess 146 adapted in one position to connect the grooves and in another position to interrupt communication therebetween. The upper end of the valve member 145 is pivotally connected to an arm 147 on a shaft 148 mounted in the housing 115, and provided at the front with a hand lever 149.

Slidably mounted in the chamber 131 of the valve 96 is a valve member 150 having an annular recess 151. A snap ring 152 on one end of the valve member 150 is arranged for engagement with the casing 81 to define one end position in which the recess 151 establishes free communications between the inlet groove 133 and the exhaust groove 134. The valve member 150 is normally urged into this end position by suitable pressure means, such as a coil compression spring 153, seated in a recess 154 in an end plate 155 on the casing 81. It will be evident that when the valve 96 is in open position as shown, pressure fluid will be by-passed directly to the exhaust passage 94 through the chamber 131, the groove 134, the passage 136, the groove 86, the passage 93 and the groove 91, and hence no pressure for indexing the tool slide 68 will be available in the passage 95. However, when the valve member 150 is moved to the right against the action of the spring 153, the recess 151 will be moved out of communication with the groove 133 to block the by-pass through the chamber 131 to the groove 134 so that fluid under full pressure will be available in the passage 95 to index the tool slide 68.

The index control valve 96 is adapted to be closed for a predetermined adjustable interval at each reversal of the work carriage 3. In the present instance, the means for this purpose comprises an electric solenoid 156 mounted on an end bracket 157 on the valve casing 81. The solenoid 156 includes an axial core 158 which is aligned and in end abutment with the valve member 150, and which upon energization of the solenoid coil is projected to move the valve member quickly into closed position.

The energizing circuit for the solenoid 156 leads from the main $L_1$ through a line 159, a master switch 160, a line 161, the solenoid coil 156, a line 162, a normally open time delay switch 163 with yieldable contacts, and a line 164 to the main $L_2$. The switch 163 is normally held open by a spring 165, and is movable into closed position with the contacts in flexed position upon excitation of an actuating coil 166 adapted to be connected across the lines 161 and 164 by a normally open switch 167. A dog 168 on the lever 46 is adapted in the course of its oscillations upon each actuation of the pilot valve 34 to engage and close the switch 167 momentarily. Opening of the switch 163 by the spring 165 after each excitation of the coil 166 is suitably delayed for a desired period of time by a dash pot 169 which comprises a cylinder 170, a piston 171 in the cylinder and connected to the valve stem, a by-pass line 172 connecting opposite ends of the cylinder and including a manually adjustable throttle valve 173, and a parallel by-pass line 174 including a one-way check valve 175 permitting quick closing of the switch.

In operation, for normal intermittent indexing, the valve 140 is open. At each reversal of the work carriage 3, the dog 168 closes the switch 167 momentarily to effect closing of the switch 163. This causes energization of the solenoid 156 which moves the by-pass valve 96 into closed position. The valve 96 remains closed until the time switch 163 opens, and thereupon is quickly returned to full open position. When the valve 96 is closed, pressure fluid from the pump 40 is directed to the cylinder 72 to effect cross indexing. The extent of each cross indexing movement or step is, therefore, dependent on the time interval during which the valve 96 is closed. This interval may be varied as desired by adjusting the throttle valve 173 of the dash pot 169. It will be seen that in each traverse of the work carriage 3, the grinding wheel 70 takes a cut along the work. At the end of each cut, the grinding wheel 70 is indexed through a distance somewhat less than the width of its face so that in the next traverse of the carriage 3 in the reverse direction it will take a parallel contiguous cut. The carriage 3 is reciprocated and the grinding wheel 70 is indexed step-by-step in the foregoing manner until the entire work surface to be ground has been traversed. At this point, the indexing movement may be automatically reversed, and the operation continued to take a second cut on the work surface.

In some instances, the last cross feed movement to complete the indexing in either direction across the work may be less than the normal extent of indexing. Provision is made for preventing reversal of the valve 77 after a partial indexing movement until after the carriage 3 has completed a full traverse along the edge of the work. The means for this purpose comprises two plungers 176 and 177 reciprocable in transverse bores 178 and 179 formed in the end plates 157 and 155 of the casing 81 and respectively intersecting the outer ends of the bores 101 and 102. The outer ends of the bores 178 and 179 are enlarged to define pressure chambers connected to the pressure conduit 95. The inner ends of the plungers 176 and 177 are beveled for camming engagement respectively with similarly beveled ends on the pistons 103 and 104. Suitable heads 180 and 181 on the outer ends of the plungers 176 and 177 are adapted for engagement with the outer edges of the bores 178 and 179 to limit inward movement of the plungers. When both plungers 176 and 177 are located in their innermost positions, as shown in Fig. 6, they act to locate the valve member 97 in neutral position in which the pressure groove 84 is blocked from the grooves 83 and 85 to prevent cross indexing.

In operation, the valve member 97 normally occupies one end position or the other. Upon the institution of each cross indexing movement, the pressure in the passage 95 acts to urge the plungers 176 and 177 inwardly. One plunger will be blocked by the valve member 97, and the other plunger will be projected into the path of the other end of the valve member to prevent reversal of the valve 77 at the time past neutral position. Should the pilot valve 78 be reversed during the indexing operation, for example, after a cross feed through a portion of the normal indexing movement to complete the feed across the work, it will condition the direction valve 77 for reversal but at the time will cause the valve 77 to move into neutral position so as to stop further cross feed. After completion of the indexing operation, as determined by the opening of the valve 96, the pressure in the passage 95 will be dissipated to relieve the plungers 176 and 177, and thereupon the direction valve 77 will complete its reversal. However, indexing in the reverse direction will not occur until the work carriage 3 has completed its final traverse along the edge of the work and pressure fluid is again supplied to the passage 95.

The normal indexing or cross feed is rapid and intermittent. A normally open hand switch 182 is available to complete a circuit from the line 162 to the line 164 to shunt the time switch 163. When the switch 182 is closed, the solenoid 156 is constantly excited, and cross indexing is rapid and continuous and independent of the movement of the carriage 3. Continuous slow speed indexing, especially adapted for dressing and setting-up operations, may be obtained at will by actuating the lever 149 to close the valve 140. This requires the indexing fluid to pass through the adjustable restriction 139, and hence results in a reduction in the rate of fluid supply for indexing purposes. At the same time, a mercury switch 183 on the lever 149 is closed to shunt the time switch 163 across the lines 162 and 164 so as to effect continuous excitation of the solenoid 156.

To provide means for shifting or indexing the tool slide 68 manually, the idler gear 129ª is fixed on the lower end of a vertical stub shaft 184 (Figs. 10 and 11) journaled in the tool head 64. A worm gear 185 is fixed on the upper end of the shaft 184, and is adapted to be engaged by a worm 186 when manual adjustment is desired. The worm 186 is fixed on a shaft 187, which extends eccentrically through and is journaled in the ends of an elongated sleeve or tube 188, and which is provided with a hand wheel 189 at the front end. The tube 188 is supported for rotary adjustment by means of a hand lever 190 in the front wall of the head 64, and at the rear end in a bracket 191. The arrangement is such that upon rotation of the tube 188 into one position, as shown in Fig. 10, the worm 186 will mesh with the worm gear 185 to complete the manual drive connection from the shaft 187 to the gear rack 130, and upon rotation of the tube through 180° in a counterclockwise direction as viewed from the front, the worm will be disengaged from the worm gear to interrupt the drive connection.

Provision is also made for disabling the automatic indexing means upon connection of the manual drive. Interposed in the line 161 is a normally open switch 192 which is mounted on a bracket 193 within the tool head 64, and which is adapted to be actuated into closed position by flexing a leaf spring 194 on the side of the switch housing. A collar 195 is fixed on the shaft 187, and is movable into engagement with the spring 194 to close the switch 192 upon rotation of the tube 188 to separate the worm 186 from the worm gear 185, and to permit opening of the switch when the worm is engaged with the worm gear. It will be seen that when the switch 192 is opened, the solenoid 156 cannot be energized, and hence both ends of the cross feed cylinder 72 are connected to exhaust to permit manual adjustment of the slide 68.

I claim as my invention:

1. In a machine tool, in combination, a movable machine element, a second movable machine element, a hydraulic motor for translating said first mentioned element, a source of motive fluid under pressure, means including a flow passage for directing fluid from said source to said motor, a drain passage, and a transmission control valve normally open to divert fluid from said flow passage to said drain passage, movable into closed position to interrupt communication between said passages, whereby to cause the pressure fluid to actuate said motor, and means automatically operable upon movement of said second element into a predetermined position of travel to move said control valve for an adjustable predetermined interval of time into closed position.

2. In a machine tool, in combination, a reciprocable carriage, a machine element movable transversely of said carriage, a hydraulic motor for translating said element in an indexing movement, a source of motive fluid under pressure, means including a flow passage for directing fluid from said source to said motor, a by-pass passage for diverting fluid from said flow passage, an indexing control valve for connecting and disconnecting said passages, and means automatically operable upon movement of said carriage into a predetermined position to close said valve for a predetermined time interval and thereby cause the pressure fluid to actuate said motor through a distance dependent on the time and rate of fluid supply through said flow passage.

3. In a machine tool, in combination, a reciprocable carriage, a machine element movable transversely of said carriage, a hydraulic motor for translating said element in an indexing movement, a source of motive fluid under pressure, means including a flow passage for directing fluid from said source to said motor, a by-pass passage for diverting fluid from said flow passage, an indexing control valve adapted when open to connect said passages so as to divert fluid from said motor and when closed to disconnect said passages so as to cause the pressure fluid supplied through said flow passage to actuate said motor, and means operable in synchronism with said carriage for adjusting said valve into open and closed positions.

4. In a machine tool, in combination, a reciprocable carriage, a machine element movable transversely of said carriage, a hydraulic motor for translating said element in an indexing movement, a source of motive fluid under pressure, means including a flow passage for directing fluid from said source to said motor, a by-pass passage, an indexing control valve adapted when open to connect said passages so as to divert fluid from said motor and when closed to disconnect said passages so as to cause the pressure fluid supplied through said flow passage to actuate said motor, spring means normally tending to urge said valve into open position, and means automatically operable upon movement of said carriage into a predetermined position to move said valve into closed position and to maintain said valve in closed position for a predetermined period of time.

5. In a machine tool, in combination, a reciprocable carriage, a machine element movable transversely of said carriage, a hydraulic motor for translating said element in an indexing movement, a source of motive fluid under pressure, means including a flow passage for directing fluid from said source to said motor, a by-pass passage, an indexing control valve adapted when open to connect said passages so as to divert fluid from said motor and when closed to disconnect said passages so as to cause the pressure fluid supplied through said flow passage to actuate said motor, spring means tending to urge said valve into open position, and means automatically operable to periodically close said valve respectively upon successive reversals of said carriage, said last mentioned means in each operation permitting said spring means to return said valve to full open position after a predetermined time delay.

6. In a machine tool, in combination, a slidable member, a hydraulic piston and cylinder motor for translating said member, a pump for supplying a fluid medium under pressure, a direction valve adjustable selectively into opposite end positions to connect said motor reversibly to said source, and adjustable into intermediate neutral position to disconnect said motor from said source, a normally open by-pass valve interposed between said direction valve and said source and adapted when open to divert the pressure fluid from said motor, and when in closed position adapted to direct the fluid under pressure from said source through said direction valve to said motor, means normally tending to open said by-pass valve, normally inactive electromagnetic means for moving said by-pass valve into closed position against the action of said means, and means for effecting excitation of said electromagnetic means.

7. In a machine tool, in combination, a slidable member, a hydraulic piston and cylinder motor for translating said member, a pump for supplying a fluid medium under pressure, a direction valve adjustable selectively into opposite end positions to connect said motor reversibly to said source, and adjustable into intermediate neutral position to disconnect said motor from said source, a normally open by-pass valve interposed between said direction valve and said source and adapted when open to divert the pressure fluid from said motor, and when in closed position adapted to direct the fluid under pressure from said source through said direction valve to said motor, spring means normally tending to open said by-pass valve, normally inactive electromagnetic means for moving said by-pass valve into closed position against the action of said spring means, means for effecting excitation of said electromagnetic means, an adjustable flow control orifice interposed between said by-pass valve and said source, a valve shunting said orifice and adapted when open to provide an unrestricted path to said by-pass valve, and when closed to cause the fluid to pass through said orifice, and means for opening and closing said last mentioned valve.

8. In a machine tool, in combination, a reciprocatory carriage, a slide movable transversely of said carriage, a hydraulic motor for translating said slide, a source of fluid under pressure adapted to be connected through a flow passage to said motor, a drain passage, an index control valve interposed in said supply passage and adapted when open to connect said supply passage to said drain passage and when closed to interrupt said connection, spring means tending to move said valve into open position, a solenoid operable to move said valve into closed position against the action of said spring means, an energizing circuit for said solenoid including a normally open time-delay switch, an energizing circuit for said time-delay switch including a normally open control switch, and means automatically operable to close said control switch momentarily upon movement of said carriage into either end position.

9. In a machine tool, in combination, a reciprocatory carriage, a slide movable transversely of said carriage, a hydraulic motor for translating said slide, a source of fluid under pressure adapted to be connected through a flow passage to said motor, a drain passage, an index control valve interposed in said supply passage and adapted when open to connect said supply passage to said drain passage and when closed to interrupt said connection, means tending to move said valve into open position, a solenoid operable to move said valve into closed position against the action of said means, an energizing circuit for said solenoid including a normally open time-delay switch, an energizing circuit for said time-delay switch including a normally open control switch, means automatically operable to close said control switch momentarily upon movement of said carriage into either end position, a branch circuit including a normally open switch shunting said time-delay switch, and manual means for closing said last mentioned switch.

10. In a machine tool, in combination, a reciprocatory carriage, a slide movable transversely of said carriage, a hydraulic motor for translating said slide, a source of fluid under pressure adapted to be connected through a flow passage to said motor, a restricted adjustable orifice in said passage for retarding the supply of fluid, a valve in said passage in parallel to said orifice and adapted when open to permit a more rapid supply of fluid, a drain passage, an index control valve interposed in said supply passage and adapted when open to connect said supply passage to said drain passage and when closed to interrupt said connection, spring means tending to move said valve into open position, electromagnet means operable when energized to move said valve into closed position against the action of said spring means, an energizing circuit for said electromagnetic means including a normally open time-delay switch, an energizing circuit for said time-delay switch including a normally open control switch, means automatically operable to close said last mentioned switch momentarily upon movement of said carriage into a predetermined position, a branch circuit including a normally open switch shunting said time-delay switch, and manual means for opening and closing said first mentioned valve and simultaneously therewith opening and closing said last mentioned switch.

11. In a machine tool, in combination, a reciprocatory carriage, a slide movable transversely of said carriage, a hydraulic motor for translating said slide, a source of fluid under pressure adapted to be connected through a flow passage to said motor, a restricted adjustable orifice in said passage for retarding the supply of fluid, a valve in said passage in parallel to said orifice and adapted when open to permit a more rapid supply of fluid, an index control valve adapted in normal position to prevent the flow of fluid under pressure to said motor and in operative position to cause the flow of fluid under pressure to said motor, electromagnetic means operable to effect movement of said index valve into operative position, an energizing circuit for said electromagnetic means including a normally open time-delay switch, an energizing circuit for said time-delay switch including a normally open control switch, means automatically operable to close said last mentioned switch momentarily upon movement of said carriage into a predetermined position, a branch circuit including a normally open switch shunting said time-delay switch, a second branch circuit including a switch shunting said time-delay switch, and manual means for opening and closing said first mentioned valve and simultaneously therewith opening and closing said last mentioned switch.

12. In a machine tool, in combination, a reciprocable carriage, a machine element movable transversely of said carriage, a hydraulic motor for translating said element in an indexing movement, a source of motive fluid under pressure, means including a flow passage for directing fluid from said source to said motor, an adjustable orifice in said passage providing a flow restriction, a valve in said passage in parallel to said orifice and adapted when open to permit a relatively rapid flow of fluid, means for actuating said valve selectively into open or closed position, an indexing control valve operable in normal position to prevent the flow of fluid under pressure to said motor, and in operative position to permit such flow, and means automatically operable upon movement of said carriage into a predetermined position to effect movement of said control valve out of said normal positions for a predetermined period of time.

13. In a machine tool, in combination, a reciprocatory carriage, a slide movable transversely of said carriage, a hydraulic motor for translating said slide, a source of fluid under pressure, a reciprocable direction valve adjustable reversibly to connect said motor reversibly to said source and having an intermediate neutral position to disconnect said motor from said source, an index control valve for causing the supply of a predetermined quantity of fluid from said source to said direction valve, two pistons coacting respectively with opposite ends of said reversing valve to adjust the latter, a pilot valve automatically operable upon movement of said slide into opposite end positions to direct fluid under pressure respectively to said piston, and two stop plungers adapted for movement respectively into paths of said pistons to limit reversal of said direction valve past neutral position, and means for hydraulically actuating said plungers simultaneously with the supply of fluid under pressure to said direction valve.

14. In a machine tool, in combination, a reciprocatory carriage, a slide movable transversely of said carriage, a hydraulic motor for translating said slide, a source of fluid under pressure, a reciprocable direction valve adjustable reversibly to connect said motor reversibly to said source and having an intermediate neutral position to disconnect said motor from said source, an index control valve for periodically causing the supply fluid under pressure from said source to said direction valve, two pistons slidable in cylinders and coacting respectively with opposite ends of said direction valve to reverse the latter, a pilot valve automatically operable upon movement of said slide into opposite end positions to direct fluid under pressure alternately to said cylinder to shift said direction valve, two pressure chambers connected to receive fluid under pressure in parallel with said direction valve, and opening to the outer ends of said cylinders, and two pressure responsive stop plungers reciprocable in said chambers and each being movable into the path of the adjacent piston when said direction valve is in or on the remote side of neutral position, whereby said pilot valve upon actuation is effective initially to cause movement of said direction valve into neutral position, and upon subsequent cessation of the supply of pressure fluid to said direction valve to complete the reversal of said direction valve.

15. In a hydraulic transmission, a direction valve comprising, in combination, a body formed with a valve bore and with coaxial cylinders opening to opposite ends of said bore and with a pressure inlet port, control ports respectively at opposite sides of said inlet port and a drain port, and with two transverse bores intersecting the outer ends of said cylinders and connected at their outer ends to said inlet port, a reciprocable valve plunger in said valve bore and adapted in neutral position to block said control ports from said inlet port and in opposite end positions to connect said control ports respectively and reversibly to said inlet and drain ports, two pistons coacting with opposite ends of said plunger and having free beveled ends slidable respectively in said cylinders, two stop plungers slidable in said transverse bores and having beveled ends adapted for engagement with the beveled ends of said pistons to locate said valve plungers in neutral positions upon initiating reversal thereof when pressure is available at said inlet port, and means for effecting shifting of said valve plunger.

16. In a machine tool, in combination, a support, a slide mounted on said support, a piston and cylinder motor for translating said slide, a drain, a source of fluid under pressure, a direction valve for connecting opposite ends of said motor respectively and reversibly to said source and said drain, valve means normally connecting said source to said drain and being periodically operable to disconnect said source from said drain, means responsive to the movement of said slide for reversing said direction valve, and manual means selectively available for translating said slide and being operable to disable said valve means.

17. In a machine tool, in combination, a support, a slide mounted on said support, a mechanical drive for translating said slide and including a worm wheel, a worm adapted to engage said wheel and a shaft for rotating said worm, and a tube mounted for rotary adjustment in said support and eccentrically supporting said shaft, said tube being rotatable to move said worm into and out of meshing engagement with said wheel.

18. In a machine tool, in combination, a reciprocatory carriage, a slide movable transversely of said carriage, a hydraulic motor for translating said slide, a source of fluid under pressure, a direction valve adjustable reversibly to connect said motor reversibly to said source and having an intermediate neutral position to disconnect said motor from said source, an index control valve for periodically causing the supply of a predetermined quantity of fluid from said source to said direction valve, and means automatically operable upon movement of said slide into a predetermined position to effect movement of said direction valve initially into neutral position, and then upon interruption of the supply of fluid under pressure to said direction valve to complete the reversal of said direction valve.

19. In a machine tool, in combination, a reciprocable carriage, a machine element movable transversely of said carriage, a hydraulic motor for translating said element in an indexing movement, a source of motive fluid under pressure, means including a flow passage for directing fluid from said source to said motor, a by-pass passage, an indexing control valve adapted when open to connect said passages so as to divert fluid from said motor and when closed to disconnect said passages so as to cause the pressure fluid supplied through said flow passage to actuate said motor, and means normally tending to maintain said valve in open position, and being automatically operable upon movement of said carriage into a predetermined position to move said valve into closed position and to maintain said valve in closed position for a predetermined period of time.

20. In a machine tool, in combination, a reversibly translatable carriage, a slide movable relatively to said carriage, a hydraulic motor for translating said slide, a source of fluid under pressure adapted to be connected through a flow passage to said motor, a drain passage adapted to discharge fluid from said motor, an index control valve associated with one of said passages, said valve having a normal position in which it is effective to prevent the displacement of fluid in said motor and having an operative position in which it is effective to cause the supply of fluid from said source to said motor, means including an electromagnetic actuating element and normally maintaining said valve in said normal position and being operable upon excitation of said electromagnetic element to move and maintain said valve in said operative position, an energizing circuit for said electromagnetic element including a normally open time-delay switch, an energizing circuit for said time-delay switch including a normally open control switch, means automatically operable to close said control switch temporarily upon movement of said carriage into a predetermined position, and a second energizing circuit for said electromagnetic element including a normally open control switch and shunting said time-delay switch.

21. In a machine tool, in combination, a reversibly translatable carriage, a slide movable relatively to said carriage, a hydraulic motor for translating said slide, a source of fluid under pressure adapted to be connected through a flow passage to said motor, a drain passage adapted to discharge fluid from said motor, an index control valve associated with said flow passage, said valve having a normal position in which it is effective to prevent the displacement of fluid in said motor and having an operative position in which it is effective to cause the supply of fluid from said source to said motor, hydraulic means independent of said valve for actuating said carriage, electromagnetic means operable upon excitation to move said valve into said operable position and upon deenergization to release said valve for movement into said normal position, an energizing circuit for said electromagnetic means adapted to be closed automatically for a predetermined period of time upon movement of said carriage into a predetermined position, and a parallel energizing circuit for said electromagnetic means adapted to be closed independently of the position of said carriage.

HENRY F. PATRICK.

CERTIFICATE OF CORRECTION.

Patent No. 2,276,625. March 17, 1942.

HENRY F. PATRICK.

It is hereby certified that error appears in the printed specification of the above numbered patent requiring correction as follows: Page 3, second column, line 12, for "passages 137 and 139" read --passages 137 and 39--; page 7, first column, line 42, claim 16, for "discount" read --disconnect--; and that the said Letters Patent should be read with this correction therein that the same may conform to the record of the case in the Patent Office.

Signed and sealed this 5th day of May, A. D. 1942.

(Seal)

Henry Van Arsdale,
Acting Commissioner of Patents.